(12) United States Patent
Nakadate

(10) Patent No.: US 6,860,370 B2
(45) Date of Patent: Mar. 1, 2005

(54) CONTROLLABLE DAMPING FORCE HYDRAULIC SHOCK ABSORBER

(75) Inventor: Takao Nakadate, Kanagawa (JP)

(73) Assignee: Tokico Ltd., Kawasaki (JP)

(*) Notice: Subject to any disclaimer, the term of this patent is extended or adjusted under 35 U.S.C. 154(b) by 0 days.

(21) Appl. No.: 10/305,345

(22) Filed: Nov. 27, 2002

(65) Prior Publication Data
US 2003/0098209 A1 May 29, 2003

(30) Foreign Application Priority Data
Nov. 29, 2001 (JP) ......................................... 2001-364418

(51) Int. Cl.[7] .............................................. F16F 9/348
(52) U.S. Cl. .............................. 188/282.5; 188/282.6; 188/322.13
(58) Field of Search .............................. 188/282.5, 315, 188/316, 319.1, 322.15, 282.6, 317, 318, 280, 266.5, 266.1, 266.2, 327.22

(56) References Cited

U.S. PATENT DOCUMENTS 6,332,622 B1 * 12/2001 Nakamura et al. ....... 188/266.5
6,371,262 B1 * 4/2002 Katou et al. ............. 188/266.5
6,374,967 B2 * 4/2002 Matsumoto et al. ........ 188/280
6,474,454 B2 * 11/2002 Matsumoto et al. ... 188/322.15

* cited by examiner

Primary Examiner—Robert A. Siconolfi
Assistant Examiner—Melanie Torres
(74) Attorney, Agent, or Firm—Wenderoth, Lind & Ponack, L.L.P.

(57) ABSTRACT

A piston having a piston rod connected thereto is slidably fitted in a cylinder in which a hydraulic fluid is sealably contained. Extension-stroke and compression-stroke pilot type damping force control mechanisms are provided in the piston. Check valves are provided at inlet openings of back-pressure chambers (pilot chambers). Relief valves provided in the pilot chambers include orifice passages. When the direction of stroke of the piston rod is reversed, the pressures in the back-pressure chambers are maintained due to the check valves, and the back-pressure chambers are pressurized to a satisfactory level through the orifice passages.

8 Claims, 4 Drawing Sheets

CONTROLLABLE DAMPING FORCE HYDRAULIC SHOCK ABSORBER

BACKGROUND OF THE INVENTION

The present invention relates to a controllable damping force hydraulic shock absorber which is mounted on a suspension apparatus of a vehicle such as an automobile.

As a hydraulic shock absorber mounted on a vehicle such as an automobile, there is known a controllable damping force hydraulic shock absorber in which damping force characteristics can be appropriately controlled according to road surface conditions, vehicle running conditions, etc., so as to improve ride comfort and steering stability.

Generally, a controllable damping force hydraulic shock absorber is arranged as follows. A piston, which has a piston rod connected thereto to form a piston assembly, is slidably fitted into a cylinder in which a hydraulic fluid is sealably contained. The piston divides the inside of the cylinder into two chambers. The piston assembly is provided with a main hydraulic fluid passage and a bypass passage which permit communication between the two chambers in the cylinder. The main hydraulic fluid passage is provided with a damping force generating mechanism including an orifice and a disk valve, and the bypass passage is provided with a damping force control valve for changing a flow path area of the bypass passage.

In this arrangement, a small damping force is generated by opening the bypass passage through the damping force control valve so as to reduce a resistance to the flow of the hydraulic fluid between the two chambers in the cylinder. On the other hand, a large damping force is generated by closing the bypass passage so as to increase the flow resistance between the two chambers. Thus, damping force characteristics are controlled by opening/closing the bypass passage through the damping force control valve.

However, when a damping force is controlled only by changing the flow path area of the bypass passage, the following problem arises. That is, although damping force characteristics can be changed to a large extent in a low piston speed region in which a damping force is dependent on the restriction of an orifice in a fluid passage, damping force characteristics cannot be greatly changed in intermediate and high piston speed regions in which a damping force is dependent on the degree of opening of the damping force generating mechanism (disk valve) in the main hydraulic fluid passage.

As a countermeasure, there is known a controllable damping force hydraulic shock absorber, as disclosed in Unexamined Japanese Patent Application Public Disclosure (Kokai) No. 7-332425 (corresponding to U.S. Pat. No. 5,655,633), in which a pilot type damping force control valve is provided as a damping force generating mechanism in each of a main hydraulic fluid passage for an extension stroke and a main hydraulic fluid passage for a compression stroke. In this pilot type damping force control valve, a back-pressure chamber (a pilot chamber) is formed at the back of a disk valve. The back-pressure chamber is communicated through a fixed orifice with a cylinder chamber on the upstream side of the disk valve and communicated with a cylinder chamber on the downstream side of the disk valve through a flow rate control valve (a pilot control valve).

In this controllable damping force hydraulic shock absorber, the flow rate control valve is operated, to thereby change the flow path area of a flow passage between the two chambers in the cylinder, while the pressure in the pilot chamber is changed due to a pressure loss at the flow rate control valve, to thereby change the valve-opening pressure of the disk valve. Thus, orifice characteristics (in which a damping force is approximately proportional to the square of the piston speed) and valve characteristics (in which a damping force is approximately proportional to the piston speed) can be controlled simultaneously, thus making it possible to control damping force characteristics within a wide range.

The present assignee filed, in Japan, Japanese Patent Application No. 2001-164748, with respect to a controllable damping force hydraulic shock absorber in which a pilot type damping force control valve is provided in each of an extension-stroke passage for allowing flow of a hydraulic fluid during an extension stroke of a piston rod, and a compression-stroke passage for allowing flow of the hydraulic fluid during a compression stroke of the piston rod; a damping force for an extension stroke and a damping force for a compression stroke are, respectively, controlled by means of the pilot type damping force control valve in the extension-stroke passage and the pilot type damping force control valve in the compression-stroke passage.

However, in the above-mentioned conventional controllable damping force hydraulic shook absorbers in which a pilot type damping force control valve is provided in each of the extension-stroke passage and the compression-stroke passage, the following problems arise. A pilot chamber of the pilot type damping force control valve provided in the extension-stroke passage is pressurized during an extension stroke and depressurized during a compression stroke. On the other hand, a pilot chamber of the pilot type damping force control valve provided in the compression-stroke passage is pressurized during a compression stroke and depressurized during an extension stroke. Thus, when the direction of stroke of the piston rod is reversed, the pilot chambers are subject to a considerable change in hydraulic pressure. As a result, valve bodies and seal members move and collide against valve seats and seal portions. This causes vibration and pronounced noise. Further, there is a possibility of the valve bodies and seal members being damaged due to chattering. Further, the time required for pressurizing the pilot chamber which has been in a depressurized condition is relatively long, so that a first order lag in development of a damping force occurs, thus making it difficult to obtain a desired damping force.

Further, when a pressure control valve capable of directly controlling a hydraulic pressure is used for controlling a pressure in the pilot chamber, the pressure control valve is likely to cause chattering, which results in an increase or decrease in the pressure in the pilot chamber. Therefore, a stable damping force cannot be generated.

SUMMARY OF THE INVENTION

In view of the above, the present invention has been made. It is an object of the present invention to provide a controllable damping force hydraulic shock absorber which is capable of suppressing an extreme pressure change in the pilot chamber of the pilot type damping force control valve when the direction of stroke of the piston rod is reversed.

It is another object of the present invention to enable a damping force to be generated in a stable manner during an extension stroke or a compression stroke of the piston rod.

In order to achieve the above-mentioned objects, the present invention provides a controllable damping force hydraulic shock absorber comprising: a cylinder in which a hydraulic fluid is sealably contained; a piston slidably fitted in the cylinder; a piston rod having one end connected to the piston and the other end extended to the outside of the cylinder: an extension-stroke passage which allows flow of the hydraulic fluid during an extension stroke of the piston rod; and a compression-stroke passage which allows flow of the hydraulic fluid during a compression stroke of the piston rod. A pilot type damping force control valve is provided in at least one of the extension-stroke passage and the compression-stroke passage. A check valve is provided at an inlet of a pilot chamber of the pilot type damping force control valve so as to allow flow of the hydraulic fluid into the pilot chamber and prevents flow of the hydraulic fluid out of the pilot chamber.

With this arrangement, when the direction of stroke of the piston rod is reversed, the pressure in the pilot chamber is maintained due to the check valve, thus preventing an extreme change in pressure in the pilot chamber.

The check valve may be arranged, such that it is kept closed under a hydraulic pressure lower than a predetermined valve-opening pressure and opens under a hydraulic pressure equal to or higher than the predetermined valve-opening pressure.

With this arrangement, when the pressure in the pilot chamber is controlled for controlling a damping force during an extension stroke or a compression stroke of the piston rod, rapid fluctuations in pressure in the pilot chamber can be avoided, so that a stable damping force can be generated by the controllable damping force hydraulic shock absorber.

The controllable damping force hydraulic shock absorber of the present invention may further comprise an orifice passage which allows communication between the pilot chamber of the pilot type damping force control valve and a cylinder chamber on the downstream side of the extension-stroke or compression-stroke passage in which the pilot type damping force control valve is provided.

With this arrangement, when the direction of stroke of the piston rod is reversed, the pilot chamber is pressurized through the orifice passage. Therefore, a pressure rising in the pilot chamber can be accelerated.

In the controllable damping force hydraulic shock absorber of the present invention, the check valve may include an orifice which ensures that the extension-stroke or compression-stroke passage in which the pilot type damping force control valve is provided is always communicated with the pilot chamber.

With this arrangement, when the direction of stroke of the piston rod is reversed, the pilot chamber can be rapidly pressurized without being affected by a delay in opening of the check valve. Further, a variable pressure less than the valve-opening pressure of the check valve is gradually, not rapidly, transmitted to the pilot chamber, so that an appropriate damping force can be generated in a stable manner.

Further, in the controllable damping force hydraulic shock absorber of the present invention, a flow path area of the orifice of the check valve may be smaller than a flow path area of the orifice passage.

With this arrangement, the pressure in the pilot chamber can be maintained at a sufficiently high level.

The foregoing and other objects, features and advantages of the present invention will become apparent from the following detailed description and appended claims taken in connection with the accompanying drawings.

DETAILED DESCRIPTION OF THE INVENTION

Hereinbelow, an embodiment of the present invention is described in detail, referring to the drawings.

Figure 1:
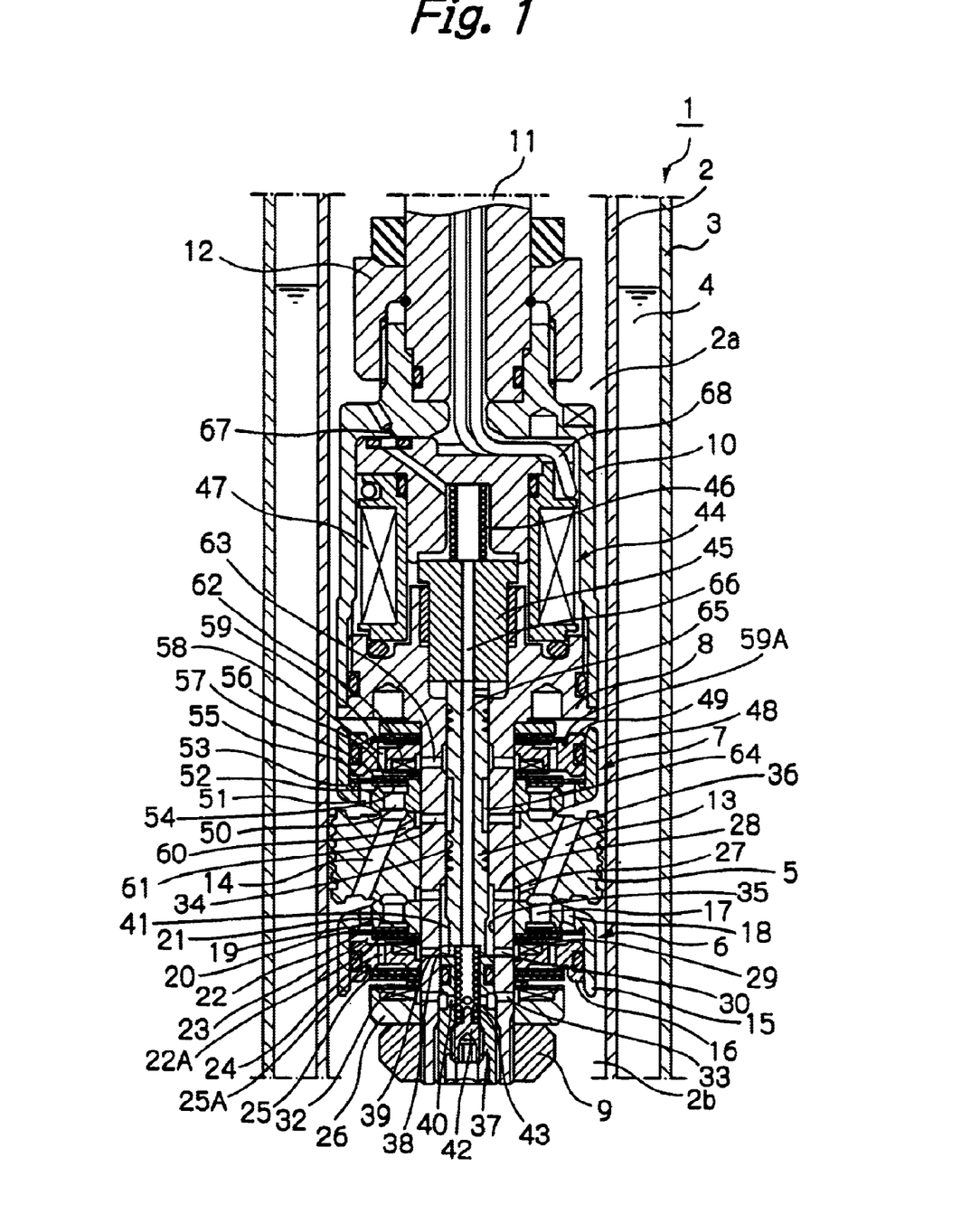
FIG. 1 is a vertical cross-sectional view of an essential part of a controllable damping force hydraulic shock absorber according to an embodiment of the present invention.

As shown in FIG. 1, a controllable damping force hydraulic shock absorber 1 in this embodiment has a double cylinder structure comprising a cylinder 2 and an outer cylinder 3 provided outside the cylinder 2. A reservoir 4 is formed between the cylinder 2 and the outer cylinder 3. A piston 5 is slidably fitted into the cylinder 2 and divides the inside of the cylinder 2 into two chambers, namely, an upper cylinder chamber 2a and a lower cylinder chamber 2b. An extension-stroke damping force control mechanism (an extension-stroke pilot type damping force control valve) 6 and a compression-stroke damping force control mechanism (a compression-stroke damping force control valve) 7 are provided on opposite ends of the piston 5. The piston 5, the extension-stroke damping force control mechanism 6 and the compression-stroke damping force control mechanism 7 are integrally connected to each other by means of a cylindrical piston bolt 8 extended therethrough and a nut 9.

A solenoid case 10 is threadably engaged with a large-diameter proximal end portion of the piston bolt 8. An end portion of a piston rod 11 is connected to the solenoid case 10 by means of a nut 12. The other end portion of the piston rod 11 extends through the upper cylinder chamber 2a, and a rod guide (not shown) and an oil seal (not shown) provided on an upper end of the cylinder 2 and the outer cylinder 3 to the outside of the cylinder 2. A base valve (not shown) is provided at a lower end portion of the cylinder 2. The base valve permits communication between the lower cylinder chamber 2b and the reservoir 4 with an appropriate flow resistance. A hydraulic fluid is sealably contained in the cylinder 2, and a hydraulic fluid and a gas are sealably contained in the reservoir 4.

An extension-stroke passage 13 and a compression-stroke passage 14 are formed in the piston 5 so as to permit communication between the upper cylinder chamber 2a and the lower cylinder chamber 2b.

The extension-stroke damping force control mechanism 6 is arranged as follows. An inner valve member 16 is fitted into an outer valve member 15 generally in the form of a cylinder, one end of which is closed, and a hydraulic fluid passage 17 and a hydraulic fluid passage 18 are formed on a radially inner side and a radially outer side of the closed end of the outer valve member 15. The hydraulic fluid passage 17 is communicated with the extension-stroke passage 13. The hydraulic fluid passage 18 is open to the lower cylinder chamber 2b. An annular seat portion 19 protrudes from the closed end of the outer valve member 15 between the hydraulic fluid passage 17 and the hydraulic fluid passage 18. An annular seal portion 20 protrudes from the closed end of the outer valve member 15 outside the hydraulic fluid passage 18. A disk valve 21 is seated on the seat portion 19 and an annular seal ring 22 is provided on an outer peripheral portion of the disk valve 21 and the seal portion 20. A spring member 22A is provided on an inner peripheral portion of the seal ring 22, and presses the disk valve 21 and the seal ring 22 against the seat portion 19 and the seal portion 20.

In the outer valve member 15, a back-pressure chamber (a pilot chamber) 23 is formed by the inner valve member 16 at the back of the disk valve 21 and the seal ring 22. In the inner valve member 16, a hydraulic fluid passage 24 is provided so as to permit communication between the back-pressure chamber 23 and the lower cylinder chamber 2b. A relief valve (a disk valve) 25 is provided in the hydraulic fluid passage 24 so as to relieve the hydraulic pressure in the back-pressure chamber 23 by the flow of the hydraulic fluid into the lower cylinder chamber 2b. An orifice passage (a cut portion) 25A is formed in a valve seat for the relief valve 25 so that the back-pressure chamber 23 is always communicated with the lower cylinder chamber 2b.

A cylindrical portion of the piston bolt 8 extending through the piston 5, the outer valve member 15, the inner valve member 16 and a spacer 26 includes ports 28, 30 and 33 formed in a side wall thereof. The port 28 is communicated with the extension-stroke passage 13 through an orifice passage 27. The port 30 is communicated with the back-pressure chamber 23 through a check valve 29 provided in the inner valve member 16. The port 33 is communicated with the lower cylinder chamber 2b through a check valve 32 provided in the spacer 26.

Figure 4:
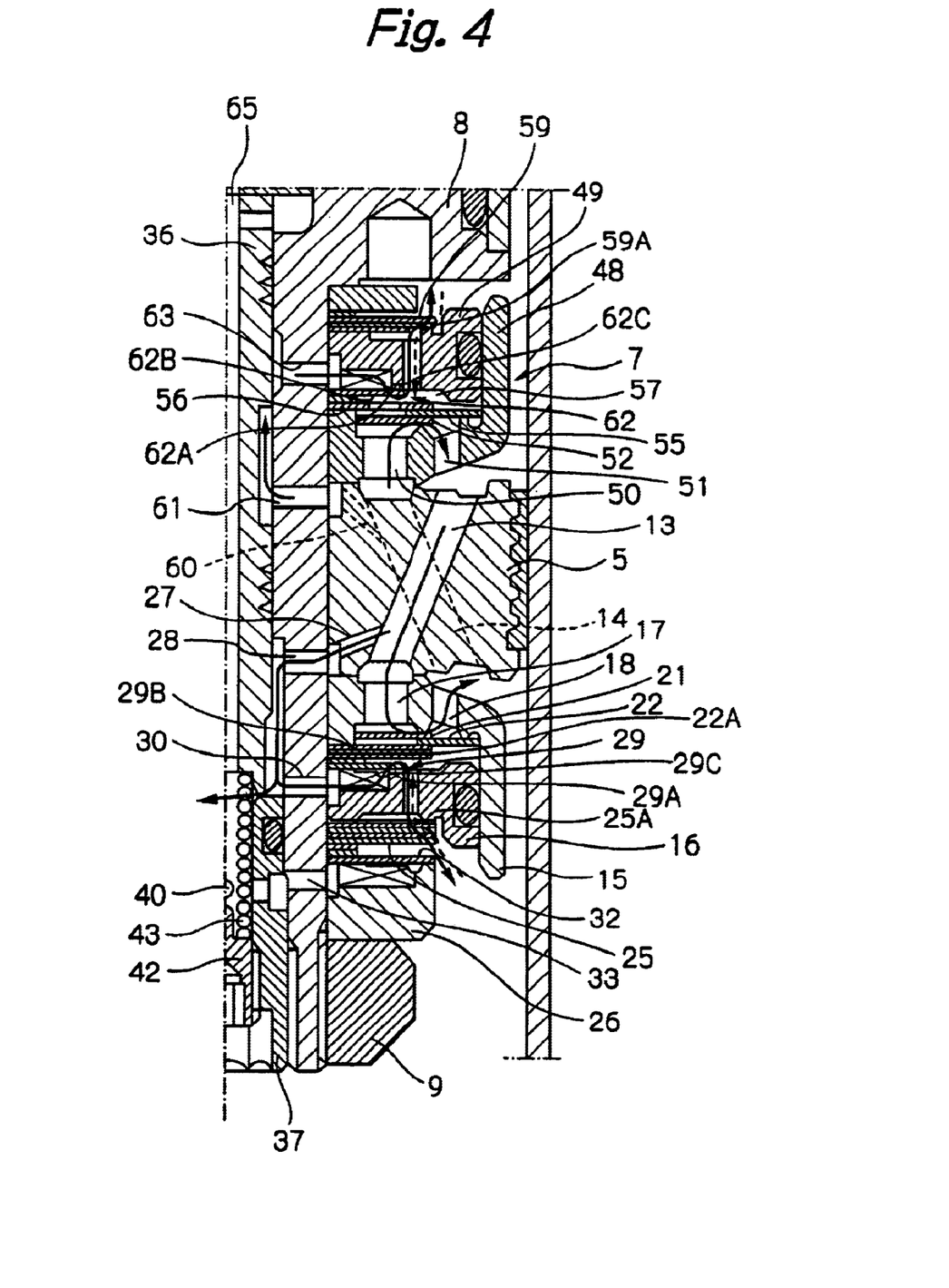
FIG. 4 is an enlarged view of an extension-stroke damping force control mechanism and a compression-stroke damping force control mechanism of the hydraulic shock absorber of FIG. 1.

As shown in FIG. 4, the check valve 29 comprises an annular valve seat 29A protruded from a radially inner side of the inner valve member 16 relative to the hydraulic fluid passage 24 and a disk valve 29B seated on the valve seat 29A. The check valve 29 allows flow of the hydraulic fluid from the port 30 as an inlet opening of the back-pressure chamber 23 into the back-pressure chamber 23. The valve seat 29A of the check valve 29 includes an orifice (a cut portion) 29C so that the back-pressure chamber 23 and the port 30 are always communicated with each other. A flow path area of the orifice 29C is smaller than that of the orifice passage 25A of the relief valve 25.

The disk valve 29B has a predetermined stiffness. A valve-opening pressure of the check valve 29 is set so that the check valve 29 is closed when the hydraulic pressure on a side of the port 30 is lower than a predetermined level. That is, the check valve 29 opens so as to allow flow of the hydraulic fluid from the port 30 to the back-pressure chamber 23 only when the hydraulic pressure on a side of the port 30 is equal to or higher than a predetermined valve-opening pressure.

A small-diameter bore 34 is formed in the cylindrical portion of the piston bolt 8 on a side of the proximal end portion of the piston bolt 8 and a large-diameter bore 35 is formed in the cylindrical portion of the piston bolt 8 on a side of a distal end portion of the piston bolt 8. A slider 36 is inserted into the cylindrical portion of the piston bolt 8 and has a slidable fit on the interior of the piston bolt 8 in the small-diameter bore 34. A plug 37 is screwed into a distal end portion of the large-diameter bore 35. A cylindrical valve body 39 is formed at an end portion of the slider 36 so as to face an annular valve seat 38 formed at an end portion of the plug 37. The port 28 and the port 30 in the piston bolt 8 are always communicated with each other through the large-diameter bore 35. The ports 28 and 30 are communicated with the port 33 through a hydraulic fluid passage 40 formed in the plug 37. The valve body 39 is separated from or brought into contact with the valve seat 38, to thereby permit or prevent communication between the ports 28 and 30, and the port 33.

In the large-diameter bore 35, the slider 36 includes a pressure-receiving portion (a stepped portion) 41 formed in a manner such as to reduce the diameter of the portion of the slider 36 on a side close to the valve body 39. The end portion of the slider 36 on a side of the valve body 39 abuts against a compression spring 43 which is provided between the slider 36 and a spring bearing 42 threadably engaged with the plug 37. An end portion of the slider 36 on a side opposite to the valve body 39 abuts against a plunger 45 of a proportional solenoid 44 provided in the solenoid case 10. A compression spring 46 is provided on a rear side of the plunger 45.

The valve seat 38, the valve body 39 and the pressure-receiving portion 41 provide a pressure control valve. The valve body 39 of the slider 36 is pressed against the valve seat 38 under the differential or resultant spring force of the compression spring 43 and the compression spring 46. When the hydraulic pressure in the large-diameter bore 35 acting on the pressure-receiving portion 41 exceeds a predetermined control pressure, the valve body 39 is lifted from the valve seat 38 against the resultant spring force of the compression spring 43 and the compression spring 46. The control pressure can be adjusted by controlling a thrust of the plunger 45 of the proportional solenoid 44, that is, the magnitude of a current applied to a coil 47 of the proportional solenoid 44.

The compression-stroke damping force control mechanism 7 is arranged as follows. An inner valve member 49 is fitted into an outer valve member 48 generally in the form of a cylinder, one end of which is closed, and a hydraulic fluid passage 50 and a hydraulic fluid passage 51 are formed on a radially inner side and a radially outer side of the closed end of the outer valve member 48. The hydraulic fluid passage 50 is communicated with the compression-stroke passage 14. The hydraulic fluid passage 51 is open to the upper cylinder chamber 2a. An annular seat portion 52 protrudes from the closed end of the outer valve member 48 between the hydraulic fluid passage 50 and the hydraulic fluid passage 51. An annular seal portion 53 protrudes from the closed end of the outer valve member 48 outside the hydraulic fluid passage 51. A disk valve 54 is seated on the seat portion 52 and an annular seal ring 55 is provided on an outer peripheral portion of the disk valve 54 and the seal portion 53. A spring member 56 is provided on an inner peripheral portion of the seal ring 55, and presses the disk valve 54 and the seal ring 55 against the seat portion 52 and the seal portion 53.

In the outer valve member 48, a back-pressure chamber (a pilot chamber) 57 is formed by the inner valve member 49 at the back of the disk valve 54 and the seal ring 55. In the inner valve member 49, a hydraulic fluid passage 58 is provided so as to permit communication between the back-pressure chamber 57 and the upper cylinder chamber 2a. A relief valve (a disk valve) 59 is provided in the hydraulic fluid passage 58 so as to relieve the hydraulic pressure in the back-pressure chamber 57 by the flow of the hydraulic fluid into the upper cylinder chamber 2a. An orifice passage (a cut portion) 59A is formed in a valve seat of the relief valve 59 so that the back-pressure chamber 57 is always communicated with the upper cylinder chamber 2a.

The cylindrical portion of the piston bolt 8 extending through the piston 5, the outer valve member 48 and the inner valve member 49 includes ports 61 and 63 formed in the side wall thereof. The port 61 is communicated with the compression-stroke passage 14 through an orifice passage 60. The port 63 is communicated with the back-pressure chamber 57 through a check valve 62 provided in the inner valve member 49.

As shown in FIG. 4, the check valve 62 comprises an annular valve seat 62A protruded from a radially inner side of the inner valve member 49 relative to the hydraulic fluid passage 58 and a disk valve 62B seated on the valve seat 62A. The check valve 62 allows flow of the hydraulic fluid from the port 63 as an inlet opening of the back-pressure chamber 57 into the back-pressure chamber 57. The valve seat 62A of the check valve 62 includes an orifice (a cut portion) 62C so that the back-pressure chamber 57 and the port 63 are always communicated with each other. A flow path area of the orifice 62C is smaller than that of the orifice passage 59A of the relief valve 59.

The disk valve 62B has a predetermined stiffness. A valve-opening pressure of the check valve 62 is set so that the check valve 62 is closed when the hydraulic pressure on a side of the port 63 is lower than a predetermined level. That is, the check valve 62 opens so as to allow flow of the hydraulic fluid from the port 63 to the back-pressure chamber 57 only when the hydraulic pressure on a side of the port 63 is equal to or higher than a predetermined valve-opening pressure.

A spool (a flow rate control valve) 64 for controlling the flow path area of a flow passage between the port 61 and the port 63 is formed in the slider 36 which is slidably fitted into the small-diameter bore 34 of the piston bolt 8. Lands of the spool 64 are provided, such that when the slider 36 moves downward as viewed in FIG. 1 and reaches a position such that the valve body 39 is seated on the valve seat 38, the spool 64 prevents communication between the port 61 and the port 63, and that when the slider 36 moves upward from the above-mentioned position by an amount exceeding a predetermined level, the spool 64 gradually opens to allow communication between the port 61 and the port 63.

Hydraulic fluid passages 65 and 66 axially extend through the slider 36 and the plunger 45, so as to permit communication between hydraulic fluid chambers formed on opposite ends of the hydraulic fluid passages 65 and 66. This ensures a smooth axial movement of the slider 36 and the plunger 45. The inside of the proportional solenoid 44 is communicated with the upper cylinder chamber 2a through an orifice passage 67 which has a sufficiently small size and is formed in the solenoid case 10. Air in the proportional solenoid 44 is discharged through the orifice passage 67 to the upper cylinder chamber 2a. A lead wire 68 connected to the coil 47 of the proportional solenoid 44 extends through the piston rod 11 having a hollow structure and is connected to a terminal (not shown) provided at a distal end portion of the piston rod 11. Thus, electricity is externally applied to the proportional solenoid 44.

Next, description is made with regard to an operation of the above-mentioned controllable damping force hydraulic shock absorber.

During an extension stroke of the piston rod 11, the fluid in the upper cylinder chamber 2a flows to the lower cylinder chamber 2b through the extension-stroke passage 13, the orifice passage 27, the port 28, the large-diameter bore 35, the hydraulic fluid passage 40 and the port 33, thus generating a damping force according to the position of the valve body 39. When the hydraulic pressure on a side of the upper cylinder chamber 2a reaches the valve-opening pressure of the disk valve 21, the disk valve 21 opens and the fluid flows through the extension-stroke passage 13, the hydraulic fluid passage 17 and the hydraulic fluid passage 18 to the lower cylinder chamber 2b. Thus, a damping force is generated by means of the disk valve 21. During a compression stroke of the piston 11, the fluid on a side of the lower cylinder chamber 2b flows through the compression-stroke passage 14, the hydraulic fluid passage 50 and the hydraulic fluid passage 51 to the upper cylinder chamber 2a. Thus, a damping force is generated by means of the disk valve 54.

Figure 2:
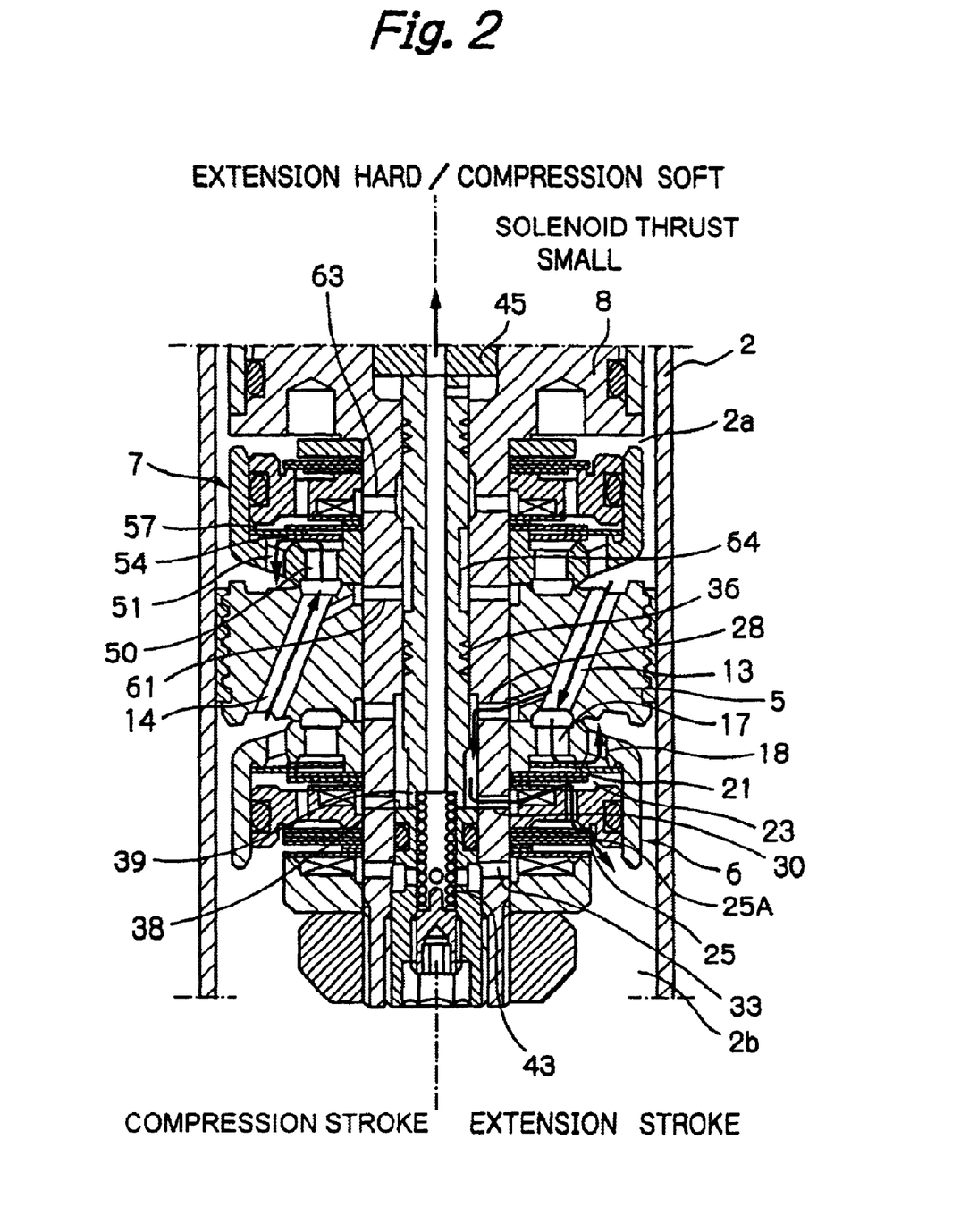
FIG. 2 is a partial illustration indicating the flow of hydraulic fluid in the controllable damping force hydraulic shock absorber of FIG. 1 when firm damping is effected during an extension stroke, and soft damping is effected during a compression stroke.

When the magnitude of a current applied to the coil 47 is reduced to thereby reduce the thrust given to the plunger 45 of the proportional solenoid 44, as shown in FIG. 2, the slider 36 moves downward due to the effect of the resultant spring force of the compression spring 43 and the compression spring 46, thus pressing the valve body 39 against the valve seat 38 while preventing communication between the port 61 and the port 63 by means of the spool 64. In this instance, in the extension-stroke damping force control mechanism 6, the control pressure of the valve body 39 becomes high, and the pressure in the back-pressure chamber 23 increases, to thereby increase the valve-opening pressure of the disk valve 21. Consequently, a large damping force is generated (firm damping is effected) during an extension stroke (see the right side of FIG. 2). It should be noted that when the hydraulic pressure in the back-pressure chamber 23 reaches a predetermined relief pressure, the relief valve 25 opens to relieve the hydraulic pressure in the back-pressure chamber 23 by the flow of the fluid into the lower cylinder chamber 2b.

More particularly, when the pressure in the large bore 35 increases while the valve body 39 rests on the valve seat 38, the pressure slightly lifts the valve body. The extent of this lift usually does not exceed about 0.2 mm since when the valve body 39 is separated from the valve seat 38, the pressure in the large bore 35 is immediately relieved to cause the valve body to move back toward the valve seat. These movements are repeated and establish a control pressure in the large bore which is generally of a predetermined value corresponding to the current applied to the coil 47.

On the other hand, in the compression-stroke damping force control mechanism 7, because the communication between the port 61 and the port 63 is prevented by means of the spool 64, the pressure in the back-pressure chamber 57 becomes low, and the valve-opening pressure of the disk valve 54 decreases, so that a small damping force is generated (soft damping is effected) during a compression stroke (see the left side of FIG. 2). When the valve body 39 as a pressure control valve opens due to the pressure in the large bore 35, the amount of lift from the valve seat 38 is about 0.2 mm as previously stated. The amount of stroke required for opening the spool 64 as a flow rate control valve is about 0.5 mm. Therefore; the spool 64 remains closed when the valve body 39 opens.

Figure 3:
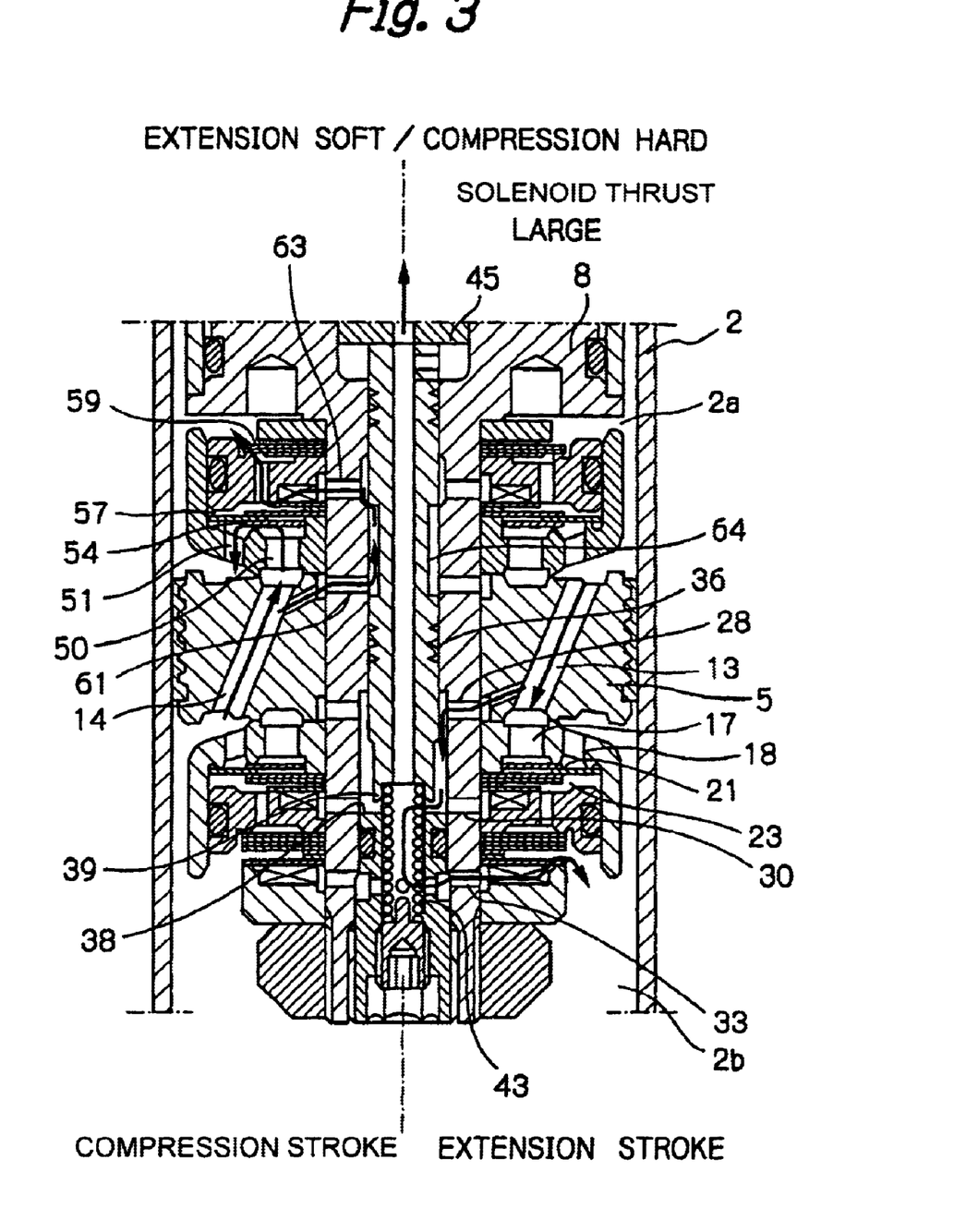
FIG. 3 is a partial illustration indicating the flow of hydraulic fluid in the controllable damping force hydraulic shock absorber of FIG. 1 when soft damping is effected during an extension stroke, and firm damping is effected during a compression stroke.

When the magnitude of the current applied to the coil 47 is increased to thereby increase the thrust given to the plunger 45 of the proportional solenoid 44, as shown in FIG. 3, the slider 36 moves upward against the resultant spring force of the compression spring 43 and the compression spring 46 and separates the valve body 39 from the valve seat 38, while allowing communication between the port 61 and the port 63 through the spool 64. In this instance, in the extension-stroke damping force control mechanism 6, the control pressure of the valve body 39 is relieved and the pressure in the back-pressure chamber 23 decreases, to thereby decrease the valve-opening pressure of the disk valve 21. Therefore, a small damping force is generated (soft damping is effected) during an extension stroke (see the right side of FIG. 3).

On the other hand, in the compression-stroke damping force control mechanism 7, because the port 61 and the port 63 are communicated with each other through the spool 64, the pressure in the back-pressure chamber 57 becomes high, and the valve-opening pressure of the disk valve 54 increases. Therefore, a large damping force is generated (firm damping is effected) during a compression stroke (see the left side of FIG. 3). When the hydraulic pressure in the back-pressure chamber 57 reaches a predetermined relief pressure, the relief valve 59 opens to relieve the hydraulic pressure in the back-pressure chamber 57 by the flow of the fluid into the upper cylinder chamber 2a.

Thus, a current is applied to the coil 47 of the proportional solenoid 44, to thereby control the pressure control valve in the extension-stroke damping force control mechanism 6 and the flow rate control valve in the compression-stroke damping force control mechanism 7 and hence the valve-opening pressures of the disk valves 21 and 54, thus enabling a damping force to be controlled within a wide range. By using a single proportional solenoid 44, the slider 36 is moved, to thereby control a damping force for an extension stroke and a damping force for a compression stroke at the same time. It is possible to provide firm damping for an extension stroke and soft damping for a compression stroke, or provide soft damping for an extension stroke and firm damping for a compression stroke, that is, so-called reverse characteristics of a damping force can be obtained.

During a single stroke (an extension or compression stroke) of the piston rod 11, upward and downward movements of the slider 36 are effected a plurality of times. This phenomenon occurs due to the following facts. When the pressure in the large diameter bore 35 is increased, the slider 36 moves upward by the effect of the pressure applied to the pressure-receiving portion 41, thereby relieving the pressure in the large diameter bore 35 through the fluid passage 40. This reduction in the pressure causes the slider 36 to move downward. These movements are repeated. This oscillatory movement of the slider allows and prevents communication between the large-diameter bore 35 and the hydraulic fluid passage 40 and communication between the port 61 and the port 63. Thus, the hydraulic pressures in the back-pressure chambers 23 and 57 are controlled in a stepwise manner or a non stepwise manner, and the extension-stroke damping force control mechanism 6 and the compression-stroke damping force control mechanism 7 generate an appropriate damping force according to vehicle conditions.

Referring to FIG. 4, during a compression stroke of the piston rod 11, the lower cylinder chamber 2b is pressurized. Therefore, in the extension-stroke damping force control mechanism 6, the hydraulic pressure in the hydraulic fluid passage 18 of the outer valve member 15 acts in a direction for lifting the seal ring 22 away from the seal portion 20. On the other hand, during a compression stroke, the upper cylinder chamber 2a is depressurized, which is to cause the back-pressure chamber 23 to be depressurized through the port 30 communicated with the upper cylinder chamber 2a. In this state, if the seal ring 22 is lifted away from the seal portion 20, the seal ring 22 collides against the seal portion 20 when the back-pressure chamber 23 is pressurized during an extension stroke. This leads to vibration and pronounced noise, and the seal ring 22 is likely to be damaged due to chattering. Further, if the back-pressure chamber 23 is depressurized during a compression stroke, a pressure rising in the back-pressure chamber 23 during an extension stroke is delayed, thereby providing a first order lag in development of a damping force and making it difficult to obtain a desired damping force.

Further, during an extension stroke of the piston rod 11, upward and downward movements of the slider 36 are effected a plurality of times so as to control the pressure in the back-pressure chamber 23 in the extension-stroke damping force control mechanism 6 in a stepwise manner or a non stepwise manner. Therefore, the back-pressure chamber 23 is to be exposed to rapid fluctuations in hydraulic pressure, leading to generation of an unstable damping force.

In the present invention, the check valve 29 is provided at the port 30 as the inlet opening of the back-pressure chamber 23. Therefore, during a compression stroke, the pressure in the back-pressure chamber 23 is maintained, thereby suppressing lift of the seal ring 22. Further, the pressure in the lower cylinder chamber 2b, which is increased during a compression stroke, is introduced into the back-pressure chamber 23 through the orifice passage 25A of the relief valve 25. Therefore, the back-pressure chamber 23 can be pressurized to a satisfactory level, so that lift of the seal ring 22 can be surely prevented, thus preventing vibration, pronounced noise, and chattering. Further, an extreme change in pressure in the back-pressure chamber 23 when the direction of stroke of the piston rod 11 is reversed can be suppressed, and a pressure rising in the back-pressure chamber 23 during an extension stroke is accelerated, so that a first order lag in development of a damping force can be avoided and a desired damping force can be rapidly obtained.

Further, as described above, the check valve 29 provided at the port 30 has a predetermined valve-opening pressure. Therefore, when upward and downward movements of the slider 36 are effected a plurality of times during an extension stroke of the piston rod 11, the back-pressure chamber 23 is not directly exposed to pressure variations on a side of the port 30 as long as the variable pressure on a side of the port 30 is lower than the valve-opening pressure of the check valve 29. Therefore, a stable damping force can be generated.

Further, by providing the orifice 29C in the check valve 29, the back-pressure chamber 23 can be rapidly pressurized during an extension stroke, without being affected by a delay in opening of the check valve 29. The orifice 29C of the check valve 29 has a sufficiently small flow path area as compared to the orifice passage 25A of the relief valve 25. Therefore, the pressure in the back-pressure chamber 23 can be maintained at a sufficiently high level during a compression stroke.

Further, the variable pressure on a side of the port 30 which is less than the valve-opening pressure of the check valve 29 can be gradually transmitted to the back-pressure chamber 23 through the orifice 29C, thus generating an appropriate damping force in a stable manner.

On the other hand, during an extension stroke of the piston rod 11, the upper cylinder chamber 2a is pressurized. Therefore, in the compression-stroke damping force control mechanism 7, the hydraulic pressure in the hydraulic fluid passage 51 of the outer valve member 48 acts in a direction for lifting the seal ring 55 away from the seal portion 53. Further, during an extension stroke, the lower cylinder chamber 2b is depressurized, which is to cause the back-pressure chamber 57 to be depressurized through the port 63 communicated with the lower cylinder chamber 2b. In this state, if the seal ring 55 is lifted away from the seal portion 53, the seal ring 55 collides against the seal portion 53 when the back-pressure chamber 57 is pressurized during a compression stroke. This leads to vibration and pronounced noise, and the seal ring 55 is likely to be damaged due to chattering. Further, if the back-pressure chamber 57 is depressurized during an extension stroke, a pressure rising in the back-pressure chamber 57 during a compression stroke is delayed, thereby providing a first order lag in development of a damping force and making it difficult to obtain a desired damping force.

Further, during a compression stroke of the piston rod 11, upward and downward movements of the slider 36 are effected a plurality of times so as to control the pressure in the back-pressure chamber 57 in the compression-stroke damping force control mechanism 7 in a stepwise manner or a non stepwise manner. Therefore, the back-pressure chamber 57 is to be exposed to rapid fluctuations in hydraulic pressure, leading to generation of an unstable damping force.

In the present invention, the check valve 62 is provided at the port 63 as the inlet opening of the back-pressure chamber 57. Therefore, during an extension stroke, the pressure in the back-pressure chamber 57 is maintained, thereby suppressing lift of the seal ring 55. Further, the pressure in the upper cylinder chamber 2a, which is increased during an extension stroke, is introduced into the back-pressure chamber 57 through the orifice passage 59A of the relief valve 59. Therefore, the back-pressure chamber 57 can be pressurized to a satisfactory level, so that lift of the seal ring 55 can be surely prevented, thus preventing vibration, pronounced noise, and chattering. Further, an extreme change in pressure in the back-pressure chamber 57 when the direction of stroke of the piston rod 11 is reversed can be suppressed, and a pressure rising in the back-pressure chamber 57 during a compression stroke is accelerated, so that a first order lag in development of a damping force can be avoided and a desired damping force can be rapidly obtained.

Further, as described above, the check valve 62 provided at the port 63 has a predetermined valve-opening pressure. Therefore, when upward and downward movements of the slider 36 are effected a plurality of times during a compression stroke of the piston rod 11, the back-pressure chamber 57 is not directly exposed to pressure variations on a side of the port 63 as long as the variable pressure on a side of the port 63 is lower than the valve-opening pressure of the check valve 62. Therefore, a stable damping force can be generated.

Further, by providing the orifice 62C in the check valve 62, the back-pressure chamber 57 can be rapidly pressurized during a compression stroke, without being affected by a delay in opening of the check valve 62. The orifice 62C of the check valve 62 has a sufficiently small flow path area as compared to the orifice passage 59A of the relief valve 59. Therefore, the pressure in the back-pressure chamber 57 can be maintained at a sufficiently high level during an extension stroke.

Further, the variable pressure on a side of the port 63 which is less than the valve-opening pressure of the check valve 62 can be gradually transmitted to the back-pressure chamber 57 through the orifice 62C, thus generating an appropriate damping force in a stable manner.

Thus, in the present invention, it is possible to prevent chattering of the pilot type damping force control valve when the direction of stroke of the piston rod is reversed. It is also possible to accelerate a pressure rising in the pilot chamber and prevent occurrence of a first order lag in development of a damping force. Therefore, there is no problem of vibration and pronounced noise, and durability of the damping force control valve can be increased. Further, a stable damping force can be generated.

In the above-mentioned embodiment, the pilot type damping force control valve is provided in each of the extension-stroke passage and the compression-stroke passage. This does not limit the present invention. The present invention may be applied to a controllable damping force hydraulic shock absorber in which a pilot type damping force control valve is provided in either one of the extension-stroke passage and the compression-stroke passage, and a conventional damping force control valve comprising an orifice and a disk valve is provided in the other passage. Further, in the above embodiment, the damping force control valve is formed in the piston assembly. However, the present invention is not limited to this embodiment. The present invention may be applied to a so-called lateral type controllable damping force hydraulic shock absorber in which a hydraulic fluid passage is provided outside the cylinder and the pilot type damping force control valve is provided in this hydraulic fluid passage.

As has been described above, in the controllable damping force hydraulic shock absorber of the present invention in which a check valve is provided in the pilot type damping force control valve, the pressure in the pilot chamber is maintained when the direction of stroke of the piston rod is reversed. Therefore, it is possible to avoid an extreme change in pressure in the pilot chamber. Consequently, it is possible to prevent chattering of the pilot type damping force control valve when the direction of stroke of the piston rod is reversed. Therefore, there is no problem of vibration and pronounced noise, and durability of the pilot type damping force control valve can be increased. Further, a stable damping force can be obtained.

Further, in the controllable damping force hydraulic shock absorber of the present invention, the check valve may be arranged, such that it is closed under a hydraulic pressure lower than a predetermined valve-opening pressure and is open under a hydraulic pressure equal to or higher than the predetermined valve-opening pressure. With this arrangement, during an extension stroke or a compression stroke of the piston rod, rapid pressure changes in the pilot chamber can be avoided, to thereby obtain a stable damping force.

Further, the controllable damping force hydraulic shock absorber of the present invention may further comprise an orifice passage which allows communication between the cylinder chamber and the pilot chamber. With this arrangement, when the direction of stroke of the piston rod is reversed, the pressure chamber is pressurized through the orifice passage, so that a pressure rising in the pilot chamber can be accelerated, and a damping force can be rapidly developed.

Further, in the controllable damping force hydraulic shock absorber of the present invention, the check valve may include an orifice. With this arrangement, the pilot chamber can be rapidly pressurized without being affected by a delay in opening of the check valve when the direction of stroke of the piston rod is reversed.

In the controllable damping force hydraulic shock absorber of the present invention, a flow path area of the orifice of the check valve may be smaller than a flow path area of the orifice passage. With this arrangement, the pressure in the pilot chamber can be maintained at a sufficiently high level.

What is claimed is:

1. A controllable damping force hydraulic shock absorber comprising:

a cylinder in which a hydraulic fluid is sealably contained;

a piston slidably fitted in the cylinder;

a piston rod having one end connected to the piston and the other end extended to the outside of the cylinder;

an extension-stroke passage which allows flow of the hydraulic fluid during an extension stroke of the piston rod;

a compression-stroke passage which allows flow of the hydraulic fluid during a compression stroke of the piston rod; and a pilot type damping force control valve provided in at least one of the extension-stroke passage and the compression-stroke passage, wherein a check valve is provided at an inlet of a pilot chamber of the pilot type damping force control valve so as to allow flow of the hydraulic fluid into the pilot chamber and prevent flow of the hydraulic fluid out of the pilot chamber.

2. A controllable damping force hydraulic shock absorber according to claim 1, wherein the check valve is kept closed under a hydraulic pressure lower than a predetermined valve-opening pressure and opens under a hydraulic pressure equal to or higher than the predetermined valve-opening pressure.

3. A controllable damping force hydraulic shock absorber according to claim 1, further comprising an orifice passage which allows communication between the pilot chamber of the pilot type damping force control valve and a cylinder chamber on the downstream side of the extension-stroke or compression-stroke passage in which the pilot type damping force control valve is provided.

4. A controllable damping force hydraulic shock absorber according to claim 3, wherein the check valve includes an orifice which ensures that the extension-stroke or compression-stroke passage in which the pilot type damping force control valve is provided is always communicated with the pilot chamber.

5. A controllable damping force hydraulic shock absorber according to claim 4, wherein a flow path area of the orifice of the check valve is smaller than a flow path area of said orifice passage.

6. A controllable damping force hydraulic shock absorber according to claim 2, further comprising an orifice passage which allows communication between the pilot chamber of the pilot type damping force control valve and a cylinder chamber on the downstream side of the extension-stroke or compression-stroke passage in which the pilot type damping force control valve is provided.

7. A controllable damping force hydraulic shock absorber according to claim 6, wherein the check valve includes an orifice which ensures that the extension-stroke or compression-stroke passage in which the pilot type damping force control valve is provided is always communicated with the pilot chamber.

8. A controllable damping force hydraulic shock absorber according to claim 7, wherein a flow path area of the orifice of the check valve is smaller than a flow path area of said orifice passage.

* * * * *